United States Patent
Mason et al.

(10) Patent No.: US 10,336,219 B2
(45) Date of Patent: Jul. 2, 2019

(54) CHILD SAFETY SEAT AND SUPPORT BASE THEREOF

(71) Applicant: Wonderland Nurserygoods Company Limited, Kwai Chung N.T. (HK)

(72) Inventors: Kyle S. Mason, West Lawn, PA (US); Colin P. Hansel, Philadelphia, PA (US); Anthony V. Ruggiero, Downington, PA (US)

(73) Assignee: WONDERLAND NURSERY GOODS COMPANY LIMITED, Kwai Chung, N.T. (HK)

( * ) Notice: Subject to any disclaimer, the term of this patent is extended or adjusted under 35 U.S.C. 154(b) by 189 days.

(21) Appl. No.: 15/164,977

(22) Filed: May 26, 2016

(65) Prior Publication Data

US 2016/0347212 A1 Dec. 1, 2016

Related U.S. Application Data

(60) Provisional application No. 62/166,782, filed on May 27, 2015.

(51) Int. Cl.
*B60N 2/28* (2006.01)

(52) U.S. Cl.
CPC ......... *B60N 2/2806* (2013.01); *B60N 2/2821* (2013.01)

(58) Field of Classification Search
CPC .. B60N 2/2806; B60N 2/2884; B60N 2/2875; B60N 2/2821
See application file for complete search history.

(56) References Cited

U.S. PATENT DOCUMENTS

| 4,311,339 A | 1/1982 | Heath |
| 5,611,596 A | 3/1997 | Barley et al. |
| 6,152,529 A | 11/2000 | van Monfort |
| 6,318,799 B1 * | 11/2001 | Greger ................ B60N 2/1835 297/256.13 |

(Continued)

FOREIGN PATENT DOCUMENTS

| CN | 201161559 Y | 12/2008 |
| CN | 102189946 A | 9/2011 |

(Continued)

OTHER PUBLICATIONS

Aug. 17, 2017 Office Action from co-pending DE Patent Application No. 102016109690.3.

(Continued)

*Primary Examiner* — Timothy J Brindley
(74) *Attorney, Agent, or Firm* — Baker & McKenzie LLP

(57) ABSTRACT

A support base for a child safety seat includes a shell body for supporting a child seat, a foot and a recline actuator. The shell body has a first and a second end opposite to each other, an upper surface facing upward, and an end surface extending generally vertical at the first end. The foot is disposed at a bottom of the shell body adjacent to the first end, and is movable to adjust an inclination of the support base. The recline actuator is connected with the shell body, and can engage with the foot to lock the foot in position. The recline actuator has at least an actuating portion exposed on the upper surface, the actuating portion being operable to cause an unlocking movement of the recline actuator for disengaging the recline actuator from the foot.

25 Claims, 13 Drawing Sheets

(56) References Cited

U.S. PATENT DOCUMENTS

| | | | |
|---|---|---|---|
| 6,508,510 B2* | 1/2003 | Yamazaki | B60N 2/2806 297/250.1 |
| 6,554,358 B2 | 4/2003 | Kain | |
| 6,705,676 B1 | 3/2004 | Berringer et al. | |
| 6,863,345 B2 | 3/2005 | Kain | |
| 7,059,677 B2 | 6/2006 | Balensiefer et al. | |
| 7,926,874 B2 | 4/2011 | Hendry | |
| 7,950,738 B2 | 5/2011 | Shafer et al. | |
| 7,988,230 B2 | 8/2011 | Heisey et al. | |
| 8,262,161 B2* | 9/2012 | Fritz | B60N 2/2806 297/253 |
| 8,348,337 B2 | 1/2013 | Franck et al. | |
| 8,353,559 B2 | 1/2013 | Williams et al. | |
| 8,573,695 B2* | 11/2013 | Van Geer | B60N 2/2806 297/256.16 |
| 9,016,781 B2 | 4/2015 | Cheng et al. | |
| 9,592,751 B2* | 3/2017 | Kirstein | |
| 2002/0084680 A1* | 7/2002 | Kain | B60N 2/2806 297/256.13 |
| 2003/0151286 A1 | 8/2003 | Kain | |
| 2004/0070246 A1* | 4/2004 | Adachi | B60N 2/2806 297/256.12 |
| 2004/0251721 A1* | 12/2004 | Yoshida | B60N 2/2851 297/250.1 |
| 2005/0110318 A1* | 5/2005 | Meeker | B60N 2/2812 297/256.16 |
| 2005/0264062 A1* | 12/2005 | Longenecker | B60N 2/2806 297/250.1 |
| 2006/0138825 A1* | 6/2006 | Eros | B60N 2/2821 297/256.13 |
| 2006/0244292 A1* | 11/2006 | Bijl | B60N 2/2806 297/250.1 |
| 2009/0066125 A1* | 3/2009 | Nett | B60N 2/2872 297/216.11 |
| 2009/0066131 A1* | 3/2009 | Hendry | B60N 2/2806 297/256.16 |
| 2010/0026059 A1* | 2/2010 | Amirault | B60N 2/2851 297/216.11 |
| 2010/0187880 A1 | 7/2010 | Heisey et al. | |
| 2010/0295346 A1* | 11/2010 | Marsden | B60N 2/2851 297/216.11 |
| 2011/0089731 A1* | 4/2011 | Gibree | B60N 2/2806 297/250.1 |
| 2011/0140491 A1* | 6/2011 | Williams | B60N 2/2806 297/256.16 |
| 2011/0169309 A1* | 7/2011 | Williams | B60N 2/2806 297/256.13 |
| 2011/0272983 A1 | 11/2011 | Fritz et al. | |
| 2013/0062917 A1* | 3/2013 | Powell | B60N 2/2872 297/216.11 |
| 2013/0088057 A1* | 4/2013 | Szakelyhidi | B60N 2/2806 297/250.1 |
| 2013/0119732 A1* | 5/2013 | Wuerstl | B60N 2/2806 297/253 |
| 2014/0008955 A1* | 1/2014 | Spence | B60N 2/265 297/256.16 |
| 2014/0117729 A1* | 5/2014 | Allen | B60N 2/4235 297/216.11 |
| 2014/0284977 A1* | 9/2014 | Williams | B60N 2/2821 297/216.11 |
| 2014/0300155 A1* | 10/2014 | Lehman | B60N 2/2821 297/256.16 |
| 2015/0183341 A1* | 7/2015 | Carpenter | B60N 2/2821 297/256.16 |
| 2016/0001681 A1* | 1/2016 | Pos | B60N 2/2821 297/216.11 |
| 2016/0046213 A1* | 2/2016 | Kirstein | B60N 2/2875 297/256.13 |
| 2016/0059746 A1* | 3/2016 | Finnestad | B60N 2/16 297/256.11 |
| 2016/0059748 A1* | 3/2016 | Cohen | B60N 2/2884 297/183.7 |
| 2016/0152164 A1* | 6/2016 | Hass | B60N 2/2866 297/216.11 |
| 2016/0176320 A1* | 6/2016 | Williams | B60N 2/2875 297/256.13 |
| 2016/0347210 A1* | 12/2016 | Mason | B60N 2/2806 |
| 2017/0065098 A1* | 3/2017 | Taylor | A47D 13/025 |
| 2018/0079330 A1* | 3/2018 | Williams | B60N 2/265 |
| 2018/0186254 A1* | 7/2018 | Chen | B60N 2/2821 |

FOREIGN PATENT DOCUMENTS

| | | |
|---|---|---|
| CN | 203611798 U1 | 12/2013 |
| CN | 103507674 A | 1/2014 |
| CN | 103770672 A | 5/2014 |
| CN | 203611798 U | 5/2014 |
| CN | 203974608 U | 12/2014 |
| DE | 69705413 T2 | 9/1999 |
| DE | 202010008803 U1 | 2/2011 |
| JP | 2004217038 A | 8/2004 |
| WO | 9806289 A1 | 2/1998 |
| WO | 2013061308 A2 | 5/2013 |
| WO | 2016032633 A1 | 3/2016 |

OTHER PUBLICATIONS

Search Report dated Nov. 29, 2016 in co-pending UK Patent Application No. 1609201.7.
Aug. 17, 2017 Office Action from co-pending DE Patent Application No. 102016109691.1 with English Summary.
Search Report dated Nov. 24, 2016 in co-pending UK Patent Application No. 1609219.9.
Office Action from co-pending Chinese Patent Application No. 201610361787.3 dated Apr. 13, 2018.

* cited by examiner

US 10,336,219 B2

CHILD SAFETY SEAT AND SUPPORT BASE THEREOF

CROSS-REFERENCE TO RELATED APPLICATION(S)

This application claims priority to U.S. Provisional Patent Application No. 62/166,782 filed on May 27, 2015, the entirety of which is incorporated herein by reference.

BACKGROUND

1. Field of the Invention

The present invention relates to child safety seats.

2. Description of the Related Art

Safety legislations require the use of a child safety seat for seating a young child in a motor vehicle. The child safety seat usually includes a child seat supported on a bottom base, and can be fastened on the vehicle seat with a seatbelt of the vehicle or a separate strap secured or provided with the child safety seat. Unfortunately, studies reveal that many child safety seats may not be properly installed in practice, which may alter the protective role provided by the child safety seat. The difficulty of properly installing the child safety seat may be due, partly, to the attachment structure or mechanism provided on the child safety seat.

Therefore, there is a need for an improved design that can facilitate the installation of the child safety seat and address at least the foregoing issues.

SUMMARY

The present application describes a child safety seat that includes a support base, and a child seat that can be detachably installed on the support base. According to one embodiment, the support base includes a shell body configured to support a child seat, a foot and a recline actuator. The shell body has a first and a second end opposite to each other, an upper surface facing upward, and an end surface extending generally vertical at the first end. The foot is disposed at a bottom of the shell body adjacent to the first end, the foot being movable relative to the shell body to adjust an inclination of the support base. The recline actuator is connected with the shell body, and can engage with the foot to lock the foot in position. The recline actuator has a first actuating portion exposed on the upper surface, the first actuating portion being operable to cause an unlocking movement of the recline actuator for disengaging the recline actuator from the foot.

According to another embodiment, the support base includes a shell body configured to support a child seat, and a cushioning part affixed with the shell body. The shell body has a first and a second end opposite to each other, and two opposite lateral sides extending from the first end to the second end, the first end of the shell body being positioned against a seatback of the vehicle seat when the support base is installed on a vehicle seat. The cushioning part is configured to deform or break under a crash load occurring during a car collision, and is disposed closer to the second end than the first end of the shell body.

DETAILED DESCRIPTION OF THE EMBODIMENTS

Figure 1:
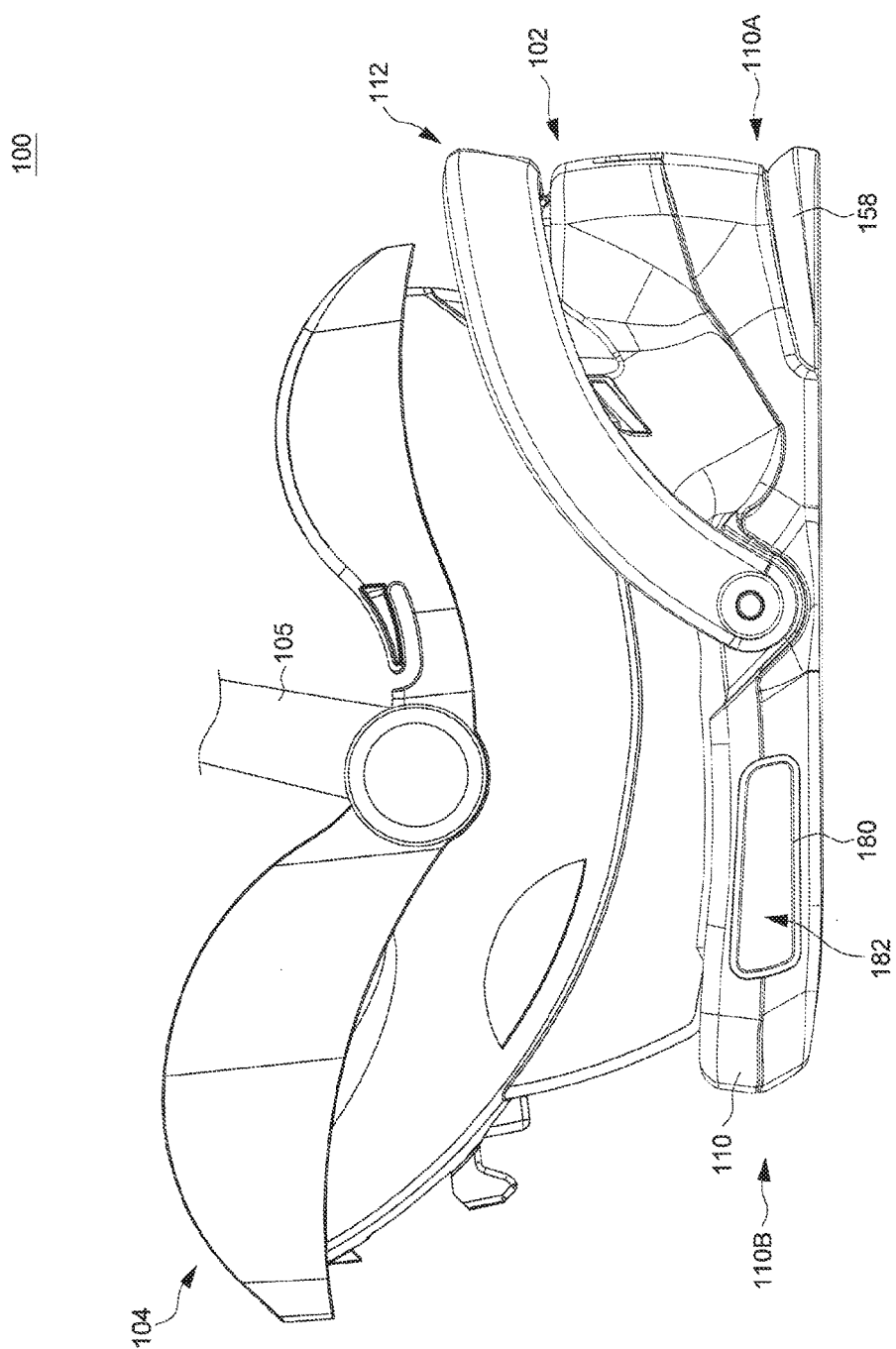
FIG. 1 is a side view illustrating an embodiment of a child safety seat.

FIG. 1 is a side view illustrating an embodiment of a child safety seat 100. The child safety seat 100 includes a support base 102, and a child seat 104 that can be detachably mounted on the support base 102. The support base 102 can provide stable support for the child seat 104, and facilitate installation of the child safety seat 100 on a vehicle seat. In particular, the support base 102 can have a bottom that can rest in a stable manner on a vehicle seat, while the child seat 104 is installed on the support base 102. The child seat 104 can be adapted to receive a child, and can be assembled with a carrying handle 105 for facilitating transport of the child seat 104.

In conjunction with FIG. 1, FIGS. 2-6 are schematic views illustrating the support base 102 in more details. The support base 102 can include a rigid shell body 110 adapted to support the child seat 104, and a belt restraining frame 112 pivotally connected with the shell body 110. The shell body 110 can be made by plastic molding. The shell body 110 can have an area that is defined between two opposite ends 110A and 110B and two opposite lateral sides 110C and 110D of the shell body 110 and is configured to receive the installation of the child seat 104, the two lateral sides 110C and 110D extending between the two ends 110A and 110B (the lateral side 110C can exemplary correspond to a left side and the lateral side 110D can exemplary correspond to a right side). Moreover, the area of the shell body 110 for receiving the child seat 104 can have two regions 110E and 110F of different heights that are respectively adjacent to the two ends 110A and 110B, the region 110E projecting upward higher than the region 110F (i.e., a greatest height of the region 110E is greater than that of the region 110F). The region 110E of the shell body 110 can have two seat mounts 114 that are transversally spaced apart from each other and protrude upward. An upper portion of each seat mount 114 can have a recess 114A in which a corresponding structure provided at an underside of the child seat 104 can engage. The child seat 104 installed on the support base 102 thus can engage with the seat mounts 114 of the shell body 110. When the support base 102 is placed on a vehicle seat, the end 110A of the shell body 110 can be positioned against a seatback of the vehicle seat, and the support base 102 can receive the installation of the child seat 104 in a rearward facing configuration.

Figure 2:
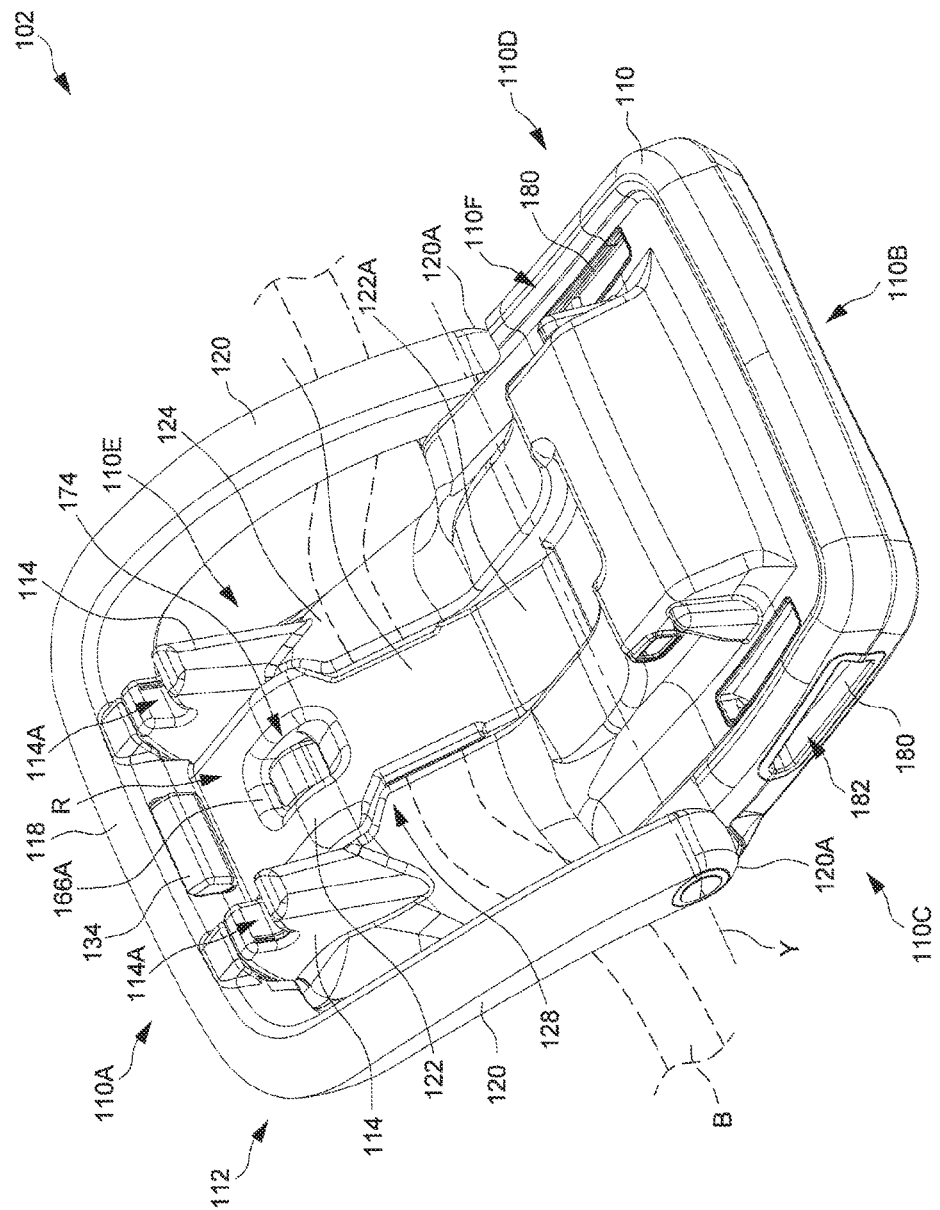
FIG. 2 is a perspective view illustrating a support base of the child safety seat.
Figure 3:
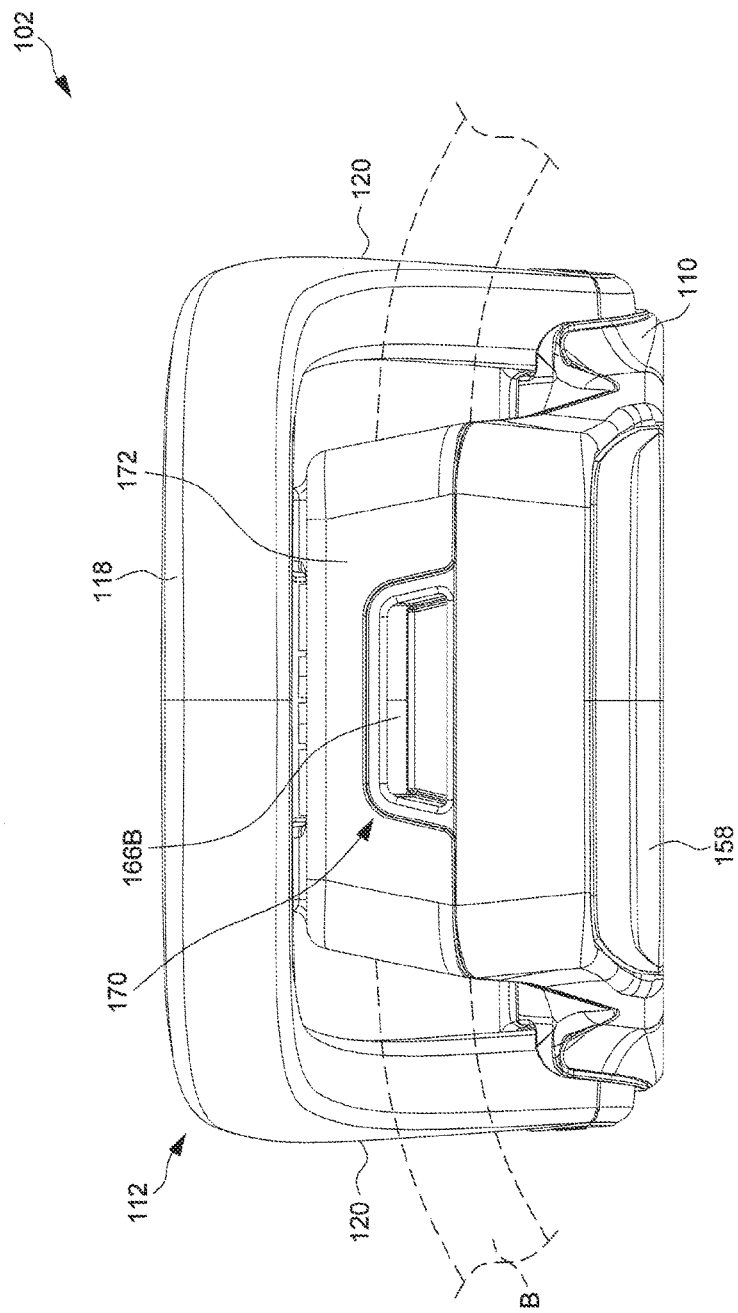
FIG. 3 is a schematic view illustrating an end of the support base.

Referring to FIGS. 2 and 3, an anchoring belt B (shown with phantom lines) may be used to securely fasten the support base 102 on a vehicle seat, the anchoring belt B being a vehicle seatbelt or an attachment strap coupled with the shell body 110. The belt restraining frame 112 can tightly hold the anchoring belt B with the shell body 110, so that the anchoring belt B can securely fasten the support base 102 on a vehicle seat. The belt restraining frame 112 includes a transversal portion 118, two side portions 120, and a middle portion 122 located between the two side portions 120. The two side portions 120 and the middle portion 122 can be fixedly connected with the transversal portion 118 so as to form a unitary block having a comb shape. Two ends 120A of the side portions 120 and an end 122A of the middle portion 122 are respectively connected pivotally with the shell body 110 at different locations, the two ends 120A of the side portions 120 respectively connecting with the two lateral sides 110C and 110D of the shell body 110, and the end 122A of the middle portion 122 connecting with a central region of the shell body 110 between the two lateral sides 110C and 110D. The belt restraining frame 112 can thereby rotate about a pivot axis Y extending transversally relative to the shell body 110 between a clamping position (better shown in FIGS. 2 and 3) and a release position (better shown in FIGS. 4-6). A spring (not shown) may be respectively connected with the middle portion 122 and the shell body 110 for biasing the belt restraining frame 112 toward the clamping position.

Figure 4:
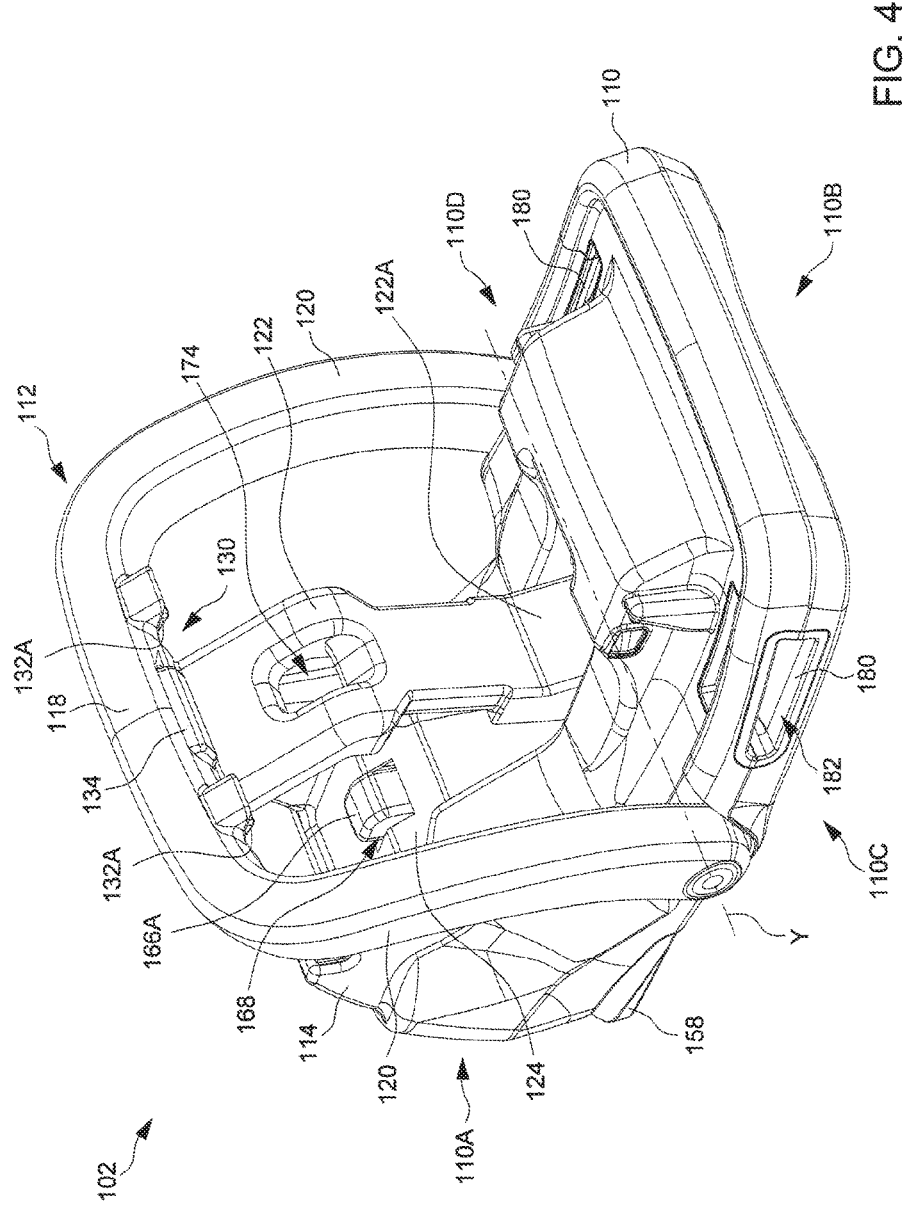
FIGS. 4-6 are various schematic views under different perspectives illustrating the support base having a belt restraining frame in a release position.
Figure 5:
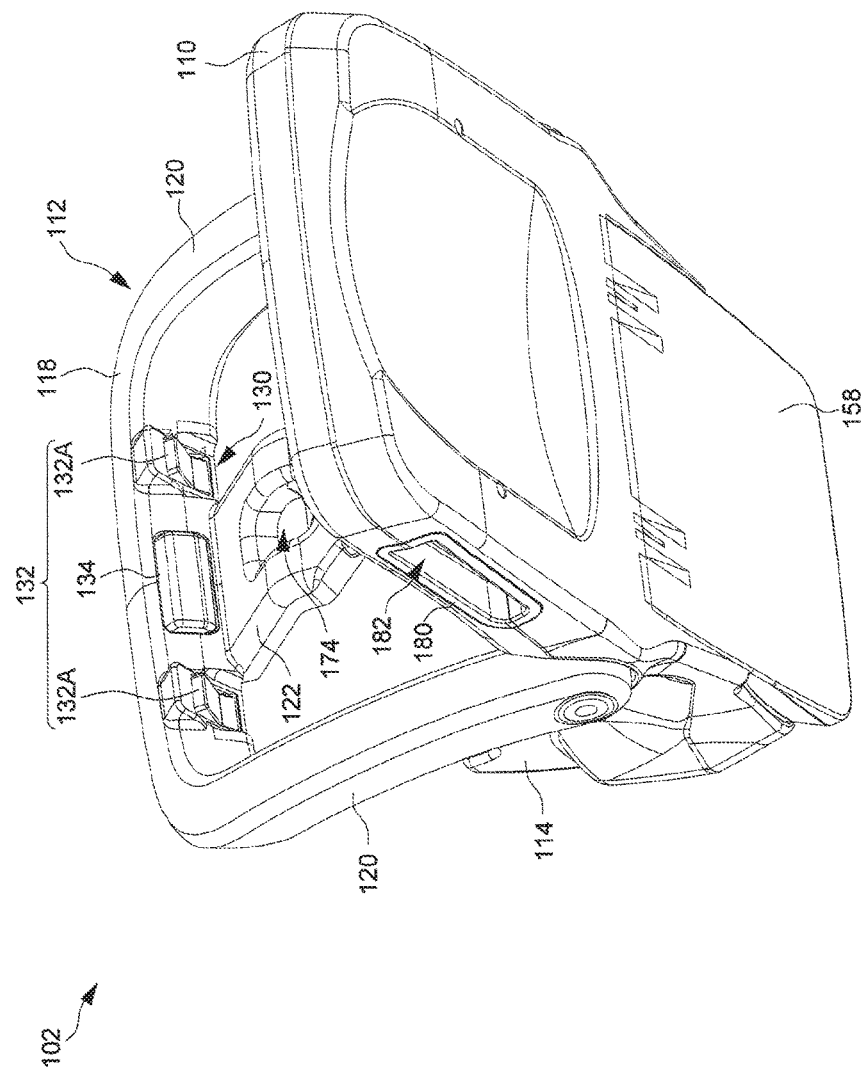
Figure 6:
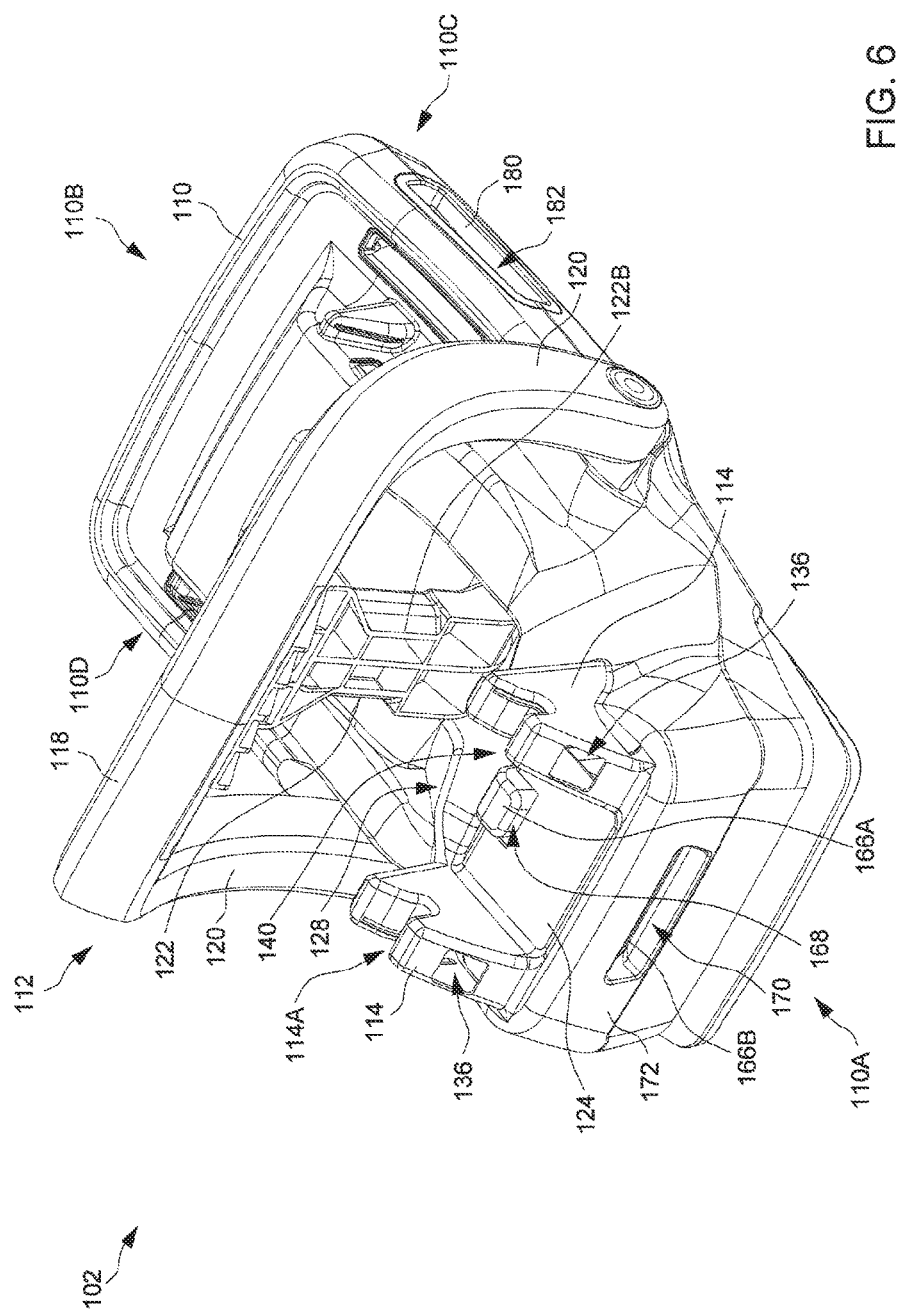
Figure 7:
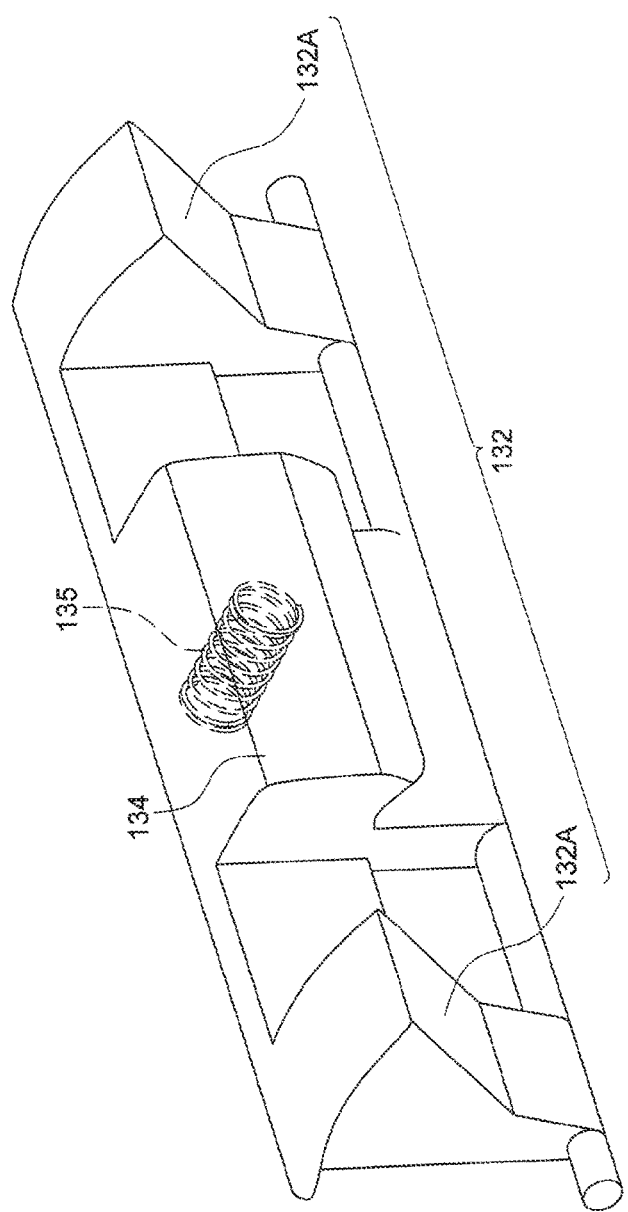
FIG. 7 is a schematic view illustrating a latching member and a release actuator used in a latch mechanism of the belt restraining frame shown in FIGS. 4-6.

When the belt restraining frame 112 is in the release position shown in FIGS. 4-6, the two side portions 120 and the middle portion 122 rise away from an upper surface 124 of the shell body 110 that is exposed outward and faces upward. The release position of the belt restraining frame 112 can facilitate transversal routing of the anchoring belt B on the upper surface 124 for attaching the support base 102 on a vehicle seat, or removal of the anchoring belt B from the upper surface 124. As it projects upward above the upper surface 124 in the release position, the belt restraining frame 112 can also prevent erroneous installation of the child seat 104 when the anchoring belt B is not securely locked in place.

When the belt restraining frame 112 is in the clamping position shown in FIGS. 2 and 3, the middle portion 122 is substantially adjacent to the upper surface 124 for pressing against the anchoring belt B that is routed transversally across the shell body 110 and below the two side portions 120 and the middle portion 122. The anchoring belt B is thereby securely held with the shell body 110, and can tightly fasten the support base 102 on a vehicle seat. In one embodiment, the upper surface 124 of the shell body 110 can further include an opening 128 at a central location, and the anchoring belt B can be routed across the opening 128. As a result, a lower surface 122B (better shown in FIG. 6) of the middle portion 122 can project into the opening 128 of the upper surface 124 when the belt restraining frame 112 is in the clamping position, and press a portion of the anchoring belt B in the opening 128, which convolutes the belt path for better gripping of the anchoring belt B. The lower surface 122B of the middle portion 122 can have a frictional material (e.g., thermoplastic elastomer) for preventing slippage of the anchoring belt B.

While the belt restraining frame 112 is in the clamping position, the middle portion 122 can extend in a region R of the shell body 110 delimited between the two seat mounts 114, the two seat mounts 114 protruding through the two gaps between the middle portion 122 and the two side portions 120. Moreover, the transversal portion 118 and the two side portions 120 can extend around the seat mounts 114 along an outer periphery of the shell body 110. Accordingly, the clamping position of the belt restraining frame 112 allows the installation of the child seat 104 on the upper surface 124 and its engagement with the seat mounts 114.

A latch mechanism can be provided to lock the belt restraining frame 112 with the shell body 110 in the clamping position. The latch mechanism can include a first part provided on the belt restraining frame 112 and a second part provided on the shell body 110, the first and second parts being engaged with each other when the belt restraining frame 112 is locked with the shell body 110 in the clamping position, and the first and second parts being disengaged from each other when the belt restraining frame 112 is in the release position. Referring to FIGS. 2 and 4-7, a latch mechanism 130 operable to lock and unlock the belt restraining frame 112 with respect to the shell body 110 can include a latching member 132 and a release actuator 134 connected with each other, both of which being assembled with the belt restraining frame 112. More specifically, the latching member 132 and the release actuator 134 can be assembled with the transversal portion 118 of the belt restraining frame 112. The latching member 132 is pivotally connected with the transversal portion 118, and has two protrusions 132A spaced apart from each other that can protrude outward through two openings provided on the transversal portion 118. The release actuator 134 can have a button shape, and can be affixed with the latching member 132, e.g., by attachment or by having the release actuator 134 and the latching member 132 formed integrally as a single part. The release actuator 134 can be disposed adjacent to a junction between the middle portion 122 and the transversal portion 118, and can be exposed for manual operation. Once the latching member 132 and the release actuator 134 are assembled with the belt restraining frame 112, the release actuator 134 is located centrally on the transversal portion 118, and the two protrusions 132A of the latching member 132 are located on two opposite sides of the middle portion 122 and release actuator 134.

The latching member 132 can engage with a corresponding structure provided on the shell body 110 to lock the belt restraining frame 112 in the clamping position, and the release actuator 134 is operable to disengage the latching member 132 from the corresponding structure on the shell body 110 for unlocking the belt restraining frame 112. As better shown in FIG. 6, the corresponding structure provided on the shell body 110 for locking engagement of the latching member 132 can include two openings 136 disposed on a side of the two seat mounts 114 that faces the same direction as the end 110A of the shell body 110. When the belt restraining frame 112 is in the clamping position, the two protrusions 132A of the latching member 132 can respectively engage with the two openings 136 on two opposite sides of the middle portion 122 to prevent rotation of the belt restraining frame 112 and lock the belt restraining frame 112 with the shell body 110. A spring 135 (shown with phantom lines in FIG. 7) connected with the release actuator 134 and/or the latching member 132 may be used to bias the latching member 132 to the locking state. For unlocking the belt restraining frame 112, the release actuator 134 can be depressed so as to drive movement of the latching member 132 for disengaging the protrusions 132A from the openings 136. The belt restraining frame 112 is thereby unlocked, and can be rotated to the release position.

Figure 8:
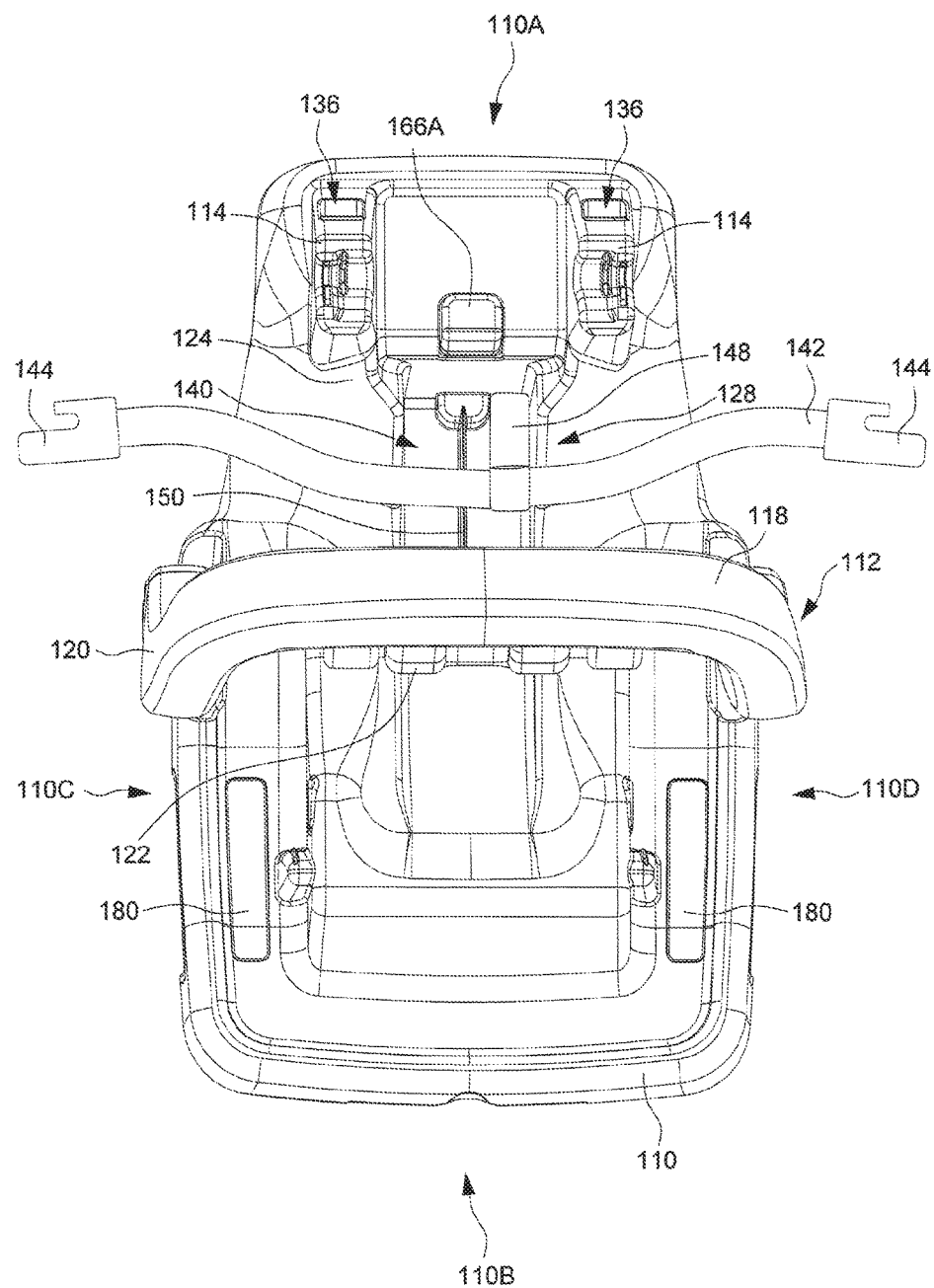
FIG. 8 is a schematic view illustrating a storage feature provided in the support base.
Figure 9:
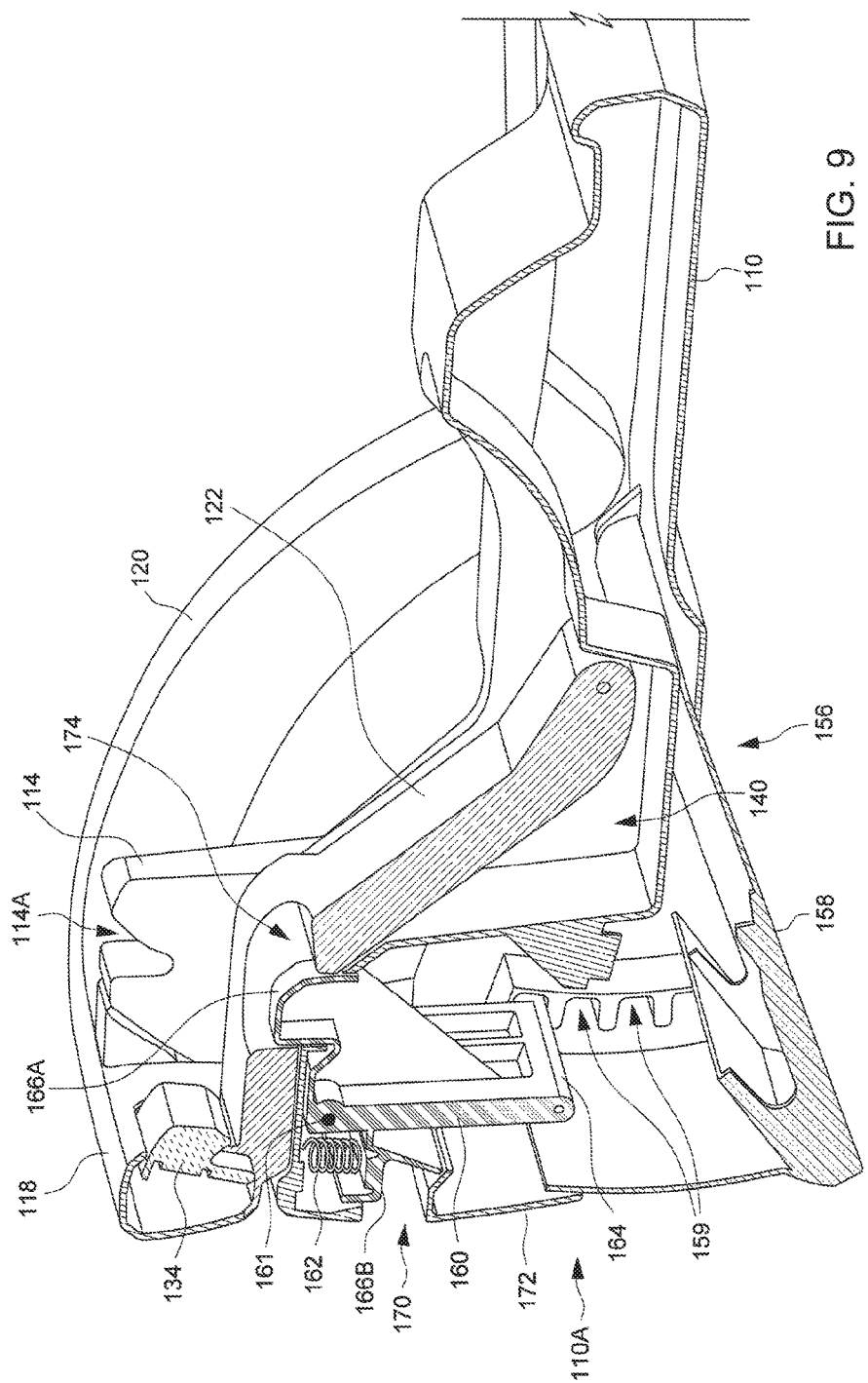
FIG. 9 is a schematic cross-sectional view illustrating a recline adjustment mechanism provided in the support base.

In conjunction with FIGS. 2 and 6, FIG. 8 is a schematic view illustrating a storage feature provided in the support base 102. For clarity, the belt restraining frame 112 is shown in the release position in FIG. 8 to better show the storage feature. Referring to FIGS. 6 and 8, the support base 102 can further include a storage cavity 140 provided in the shell body 110. The storage cavity 140 is opened on the upper surface 124 of the shell body 110 at the opening 128, and is sized to receive an attachment strap 142 and two latch connectors 144 that are coupled with the shell body 110. The attachment strap 142 has two opposite free ends, and the two latch connectors 144 are attached with the two free ends of the attachment strap 142. A leash 148 can be provided for coupling the attachment strap 142 with the shell body 110. In one embodiment, the leash 148 can be connected with the attachment strap 142 and anchored with the shell body 110 in the storage cavity 140. The attachment strap 142 and the two latch connectors 144 can be deployed outside the storage cavity 140 and installed as the anchoring belt B described previously for fastening the support base 102 on a vehicle seat, the two latch connectors 144 engaging and locking with a vehicle anchorage. When they are unused, the attachment strap 142 and the two latch connectors 144 can be stowed in the storage cavity 140.

Referring to FIGS. 2, 6 and 8, the storage cavity 140 is disposed in a region of the shell body 110 that is encompassed by the middle portion 122 of the belt restraining frame 112. When the belt restraining frame 112 is in the clamping position adjacent to the upper surface 124 of the shell body 110, the middle portion 122 can substantially or entirely close the storage cavity 140 at the upper side thereof, and an underside of the middle portion 122 can project into the storage cavity 140 and lie substantially close to a bottom surface of the storage cavity 140. While the anchoring belt B (e.g., a vehicle seatbelt or the attachment strap 142) used for fastening the support base 102 on a vehicle seat is placed transversally across the storage cavity 140 (as shown in FIG. 2), the middle portion 122 can accordingly press a portion of the anchoring belt B into the storage cavity 140 so that it is oppositely squeezed between the bottom surface of the storage cavity 140 and the middle portion 122. In one embodiment, the bottom surface in the storage cavity 140 may include a protruding rib 150 (better shown in FIG. 8), and the anchoring belt B may be squeezed against the protruding rib 150 by the middle portion 122 when the belt restraining frame 112 is in the clamping position. This can promote gripping of the anchoring belt B.

When the belt restraining frame 112 rises away from the upper surface 124 of the shell body 110 in the release position, the middle portion 122 can open the storage cavity 140. After the storage cavity 140 is opened, a caregiver can access the interior of the storage cavity 140 for stowing or retrieving of the attachment strap 142 and the two latch connectors 144.

In conjunction with FIGS. 2-4, FIG. 9 is a schematic cross-sectional view illustrating a recline adjustment mechanism 156 provided in the support base 102. Referring to FIGS. 2-4 and 9, the recline adjustment mechanism 156 can include a foot 158 and a recline actuator 160. The foot 158 is pivotally connected with the shell body 110, and is disposed at the bottom of the shell body 110 adjacent to the end 110A. The foot 158 is rotatable relative to the shell body 110 between a retracted position and an extended position for lowering and raising the end 110A of the shell body 110, thereby modifying an inclination of the support base 102 with respect to a support surface (e.g., vehicle seat surface) on which it is placed. The foot 158 can include a plurality of locking grooves 159 corresponding to different angular positions of the support base 102, and the recline actuator 160 can engage with any of the locking grooves 159 to lock the foot 158 in position. The recline actuator 160 may be biased into locking engagement with the foot 158 by a spring 162, which may be connected between the recline actuator 160 and an inner wall of the shell body 110.

The recline actuator 160 is pivotally connected with the shell body 110 at a location 161, and can include a latching portion 164 and two actuating portions 166A and 166B. In some embodiments, the recline actuator 160, including the latching portion 164 and the two actuating portions 166A and 166B, may be formed integrally as a single part. The latching portion 164 can engage with any of the locking grooves 159 to lock the foot 158 in position. The actuating portion 166A is exposed through an opening 168 formed on the upper surface 124 at a location proximate to the end 110A of the shell body 110. The other actuating portion 166B is exposed through an opening 170 formed through an end surface 172 of the shell body 110 extending generally vertical at its end 110A.

Each of the two actuating portions 166A and 166B can be manually operated for driving an unlocking rotation of the recline actuator 160 to disengage the latching portion 164 from the foot 158, thereby allowing recline adjustment of the support base 102. For example, the actuating portion 164A on the upper surface 124 of the shell body 110 can serve as a button that is depressed downward to cause unlocking rotation of the recline actuator 160. On the other hand, the other actuating portion 166B on the end surface 172 of the shell body 110 can be pushed upward to cause the same unlocking rotation of the recline actuator 160.

In some embodiments, the actuating portion 166A on the upper surface 124 of the shell body 110 may be exemplary disposed in an area between the two seat mounts 114. In this configuration, the middle portion 122 of the belt restraining frame 112 can further have an opening 174 in which the actuating portion 166A can be at least partially received when the belt restraining frame 112 is in the clamping position, as shown in FIG. 2. This can facilitate access and manual operation of the actuating portion 166A for unlocking the foot 158 while the belt restraining frame 112 is in the clamping position. When the belt restraining frame 112 is rotated to the release position, the actuating portion 166A is totally outside the opening 174 of the middle portion 122, and can also be easily accessed for manual operation.

The recline adjustment mechanism 156 described herein can be easily accessible in different configurations of use. For example, while the child seat 104 is positioned on the support base 102 (which blocks access to the actuating portion 166A on the upper surface 124), a caregiver can use the actuating portion 166B on the end surface 172 of the shell body 110 for adjusting the recline position of the support base 102. In another configuration where the support base 102 is installed on a vehicle seat with the end surface 172 positioned against the seatback of the vehicle seat (which blocks access to the actuating portion 166B), the caregiver can alternatively use the actuating portion 166A on the upper surface 124 of the shell body 110 for adjusting the recline position of the support base 102.

Figure 10:
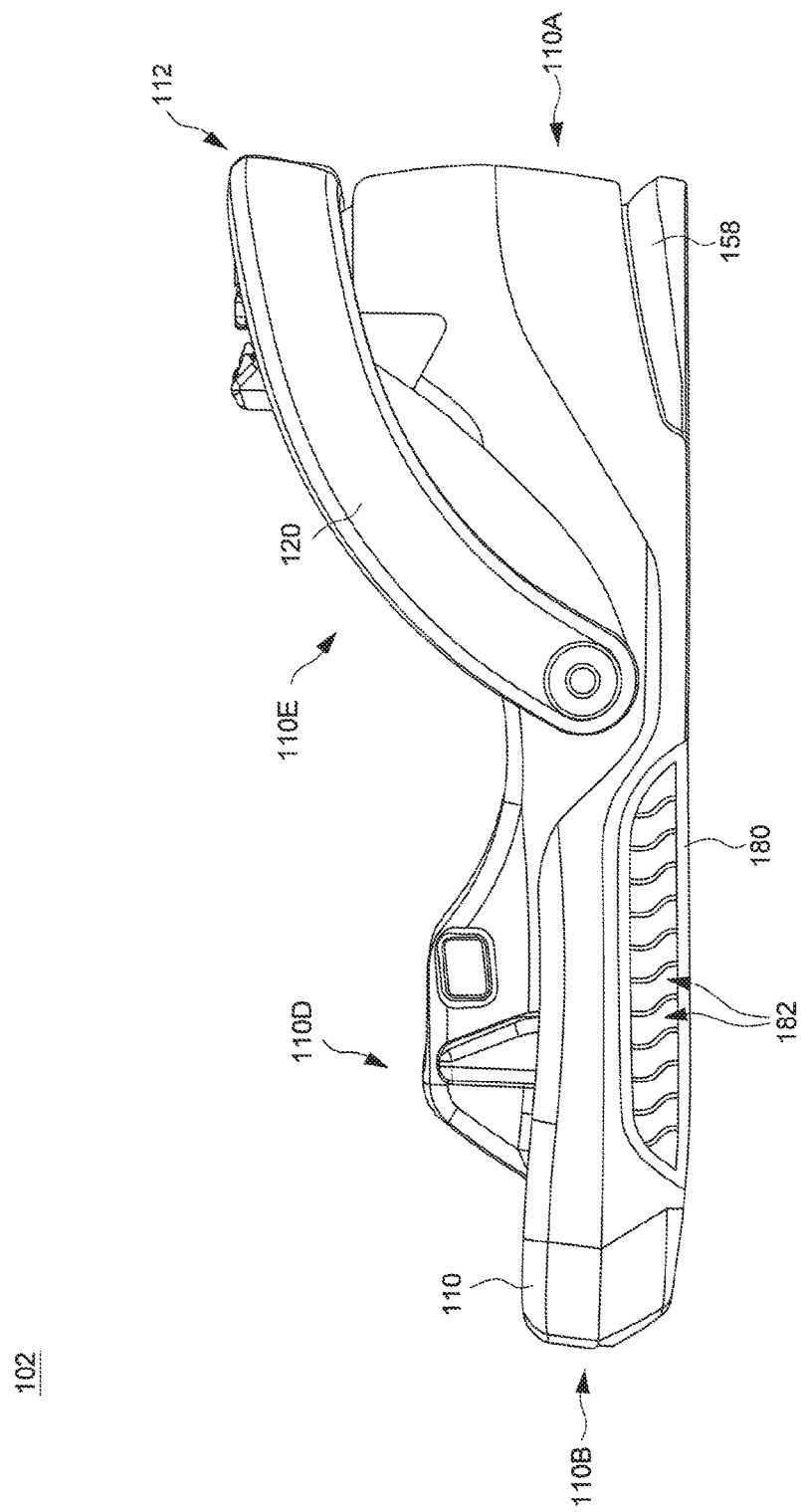
FIG. 10 is a schematic side view illustrating an exemplary implementation of a cushioning part in the support base.

According to some embodiments, the support base 102 may further include a structure for dispersing stress concentration occurring in certain specific area during car collision. Referring to FIGS. 1 and 2, the shell body 110 can be affixed with two cushioning parts 180 configured to deform or break under a crash load occurring during a car collision. Suitable materials for making each of the cushioning parts 180 can include, without limitation, plastics materials and metallic materials. In some embodiments, the cushioning parts are made of polypropylene (PP), thermoplastic elastomer (TPE), polyurethane (PU) or foam. Moreover, one or more inner cavity 182 may be provided in each cushioning part 180. The shape of the cushioning part 180 and/or inner cavity 182 can be configured to provide desirable deformation characteristics for dispersing crash energy. In FIGS. 1 and 2, the cushioning part 180 is shown as exemplarily having an elongated shape including one elongated inner cavity 182 therein. FIG. 10 is a schematic view illustrating another example of implementation in which the cushioning part 180 can have an elongated shape including multiple cells of inner cavities 182 disposed adjacent to one another, the cavities 182 being separated from one another by wave-shaped sidewalls. It will be appreciated that the cushioning part 180 is not limited to the aforementioned examples, and other shapes may be applicable.

Referring to FIGS. 1, 2 and 10, the two cushioning parts 180 can be respectively disposed in the region 110F of the shell body 110 adjacent to the two lateral sides 110C and 110D, more specifically at two locations that are closer to the end 110B than the opposite end 110A of the shell body 110. For better visibility, the two cushioning parts 180 may be respectively exposed on the two lateral sides 110C and 110D and the upper side of the shell body 110.

Figure 11:
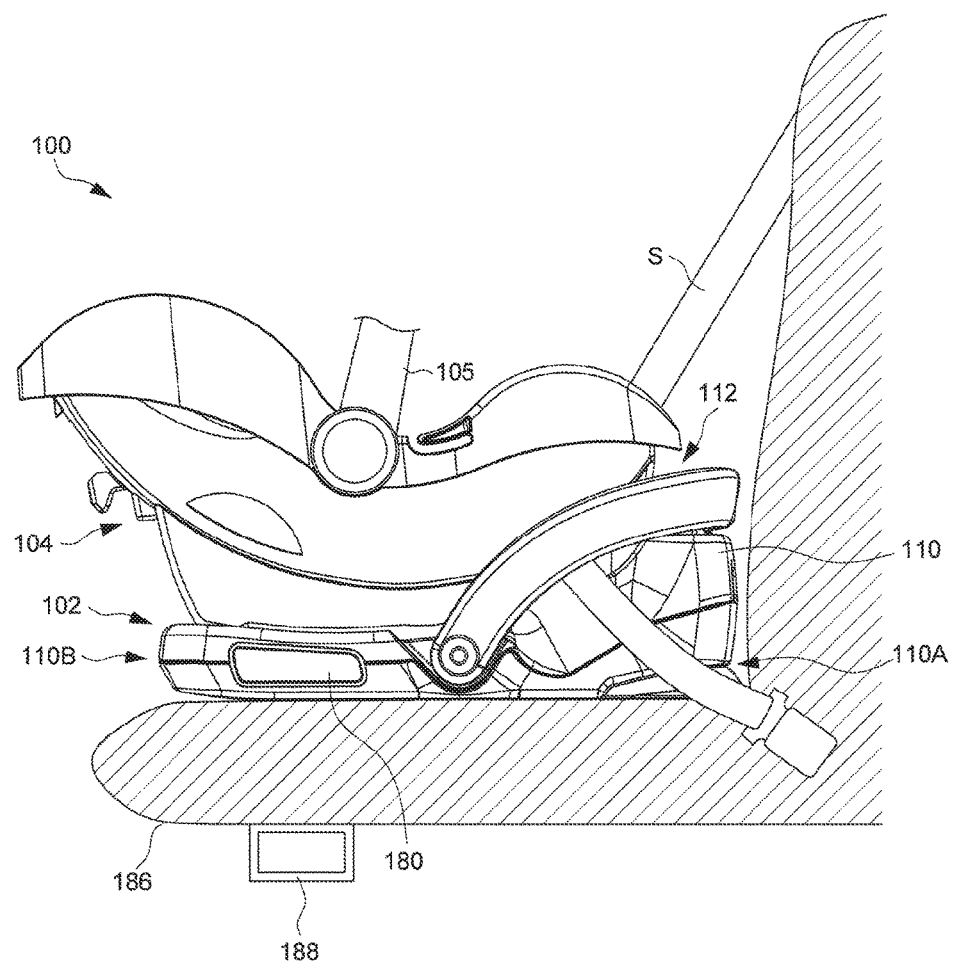
FIG. 11 is a schematic view illustrating the child safety seat in a use configuration in which the support base is fastened on a vehicle seat with a vehicle seatbelt used as an anchoring belt.
Figure 12:
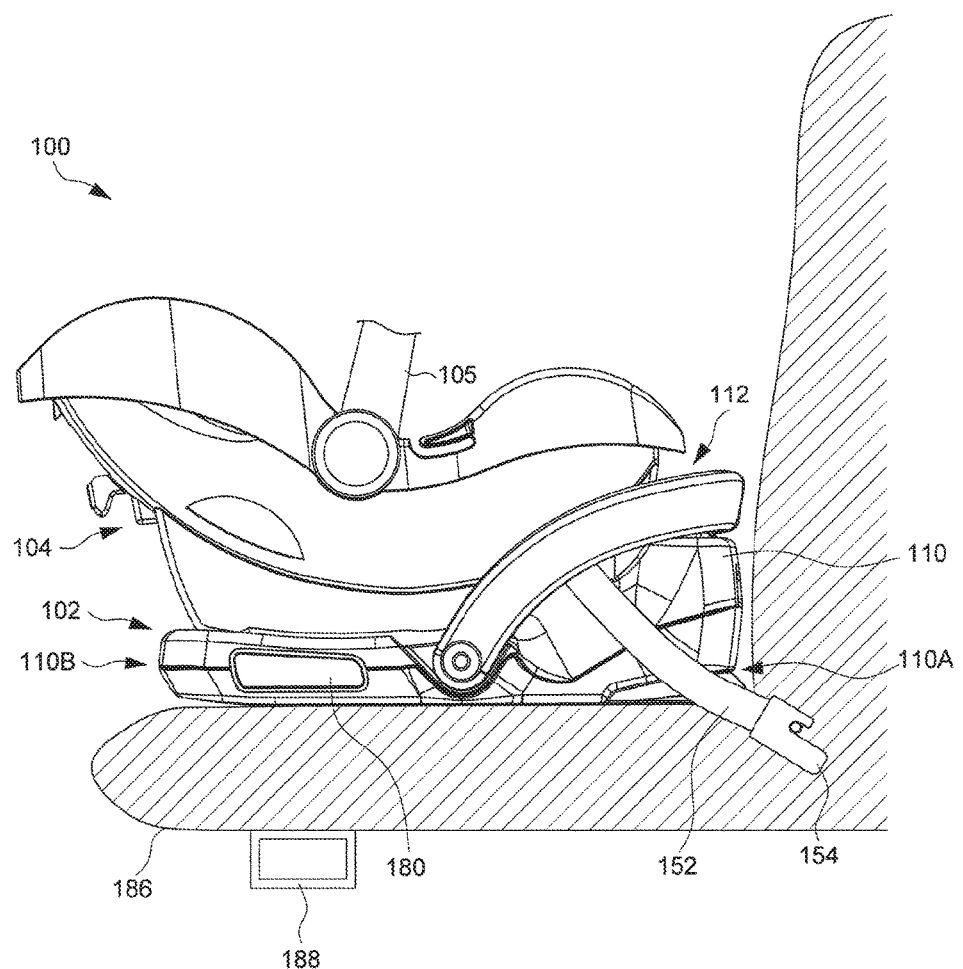
FIG. 12 is a schematic view illustrating the child safety seat in a use configuration in which the support base is fastened on a vehicle seat with a separately provided attachment strap used as an anchoring belt.

In conjunction with FIGS. 1 and 2, FIGS. 11 and 12 are schematic views illustrating two exemplary use configurations of the child safety seat 100. In FIG. 11, the child safety seat 100 is shown in a use configuration in which the support base 102 is fastened on a vehicle seat 186 with a vehicle seatbelt S used as an anchoring belt. The lap strap portion of the vehicle seatbelt S can be tightly held with the belt restraining frame 112 in the clamping position as described previously. In FIG. 12, the child safety seat 100 is shown in another use configuration in which the support base 102 is fastened on a vehicle seat 186 with the attachment strap 142 used as an anchoring belt, the latch connectors 144 of the attachment strap 142 engaging with a fixed anchorage provided in the vehicle. The vehicle seat 186 can be supported by a rigid support frame 188 affixed to the vehicle, and when the child safety seat 100 is installed on the vehicle seat 186 according to the use configuration of FIG. 11 or 12, the cushioning parts 180 may be located in a region of the vehicle seat 186 that includes at least partially the rigid support frame 188.

Figure 13:
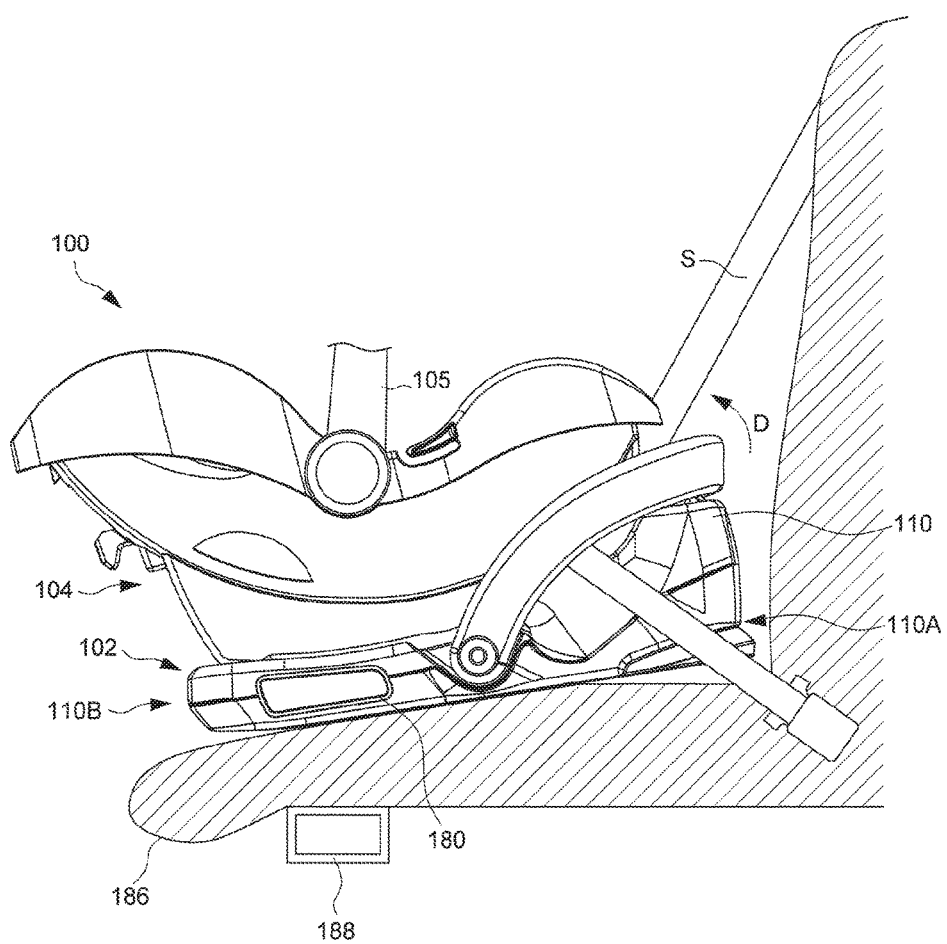
FIG. 13 is a schematic view illustrating a displacement of the child safety seat on a vehicle seat that may occur during car collision.

FIG. 13 is a schematic view illustrating a displacement of the child safety seat 100 on a vehicle seat 186 that may occur during car collision. When a car collision occurs (e.g., front collision), the child safety seat 100 may be subjected to a rotational displacement D that moves the end 110A away from the seatback of the vehicle seat 186 and pushes the end 110B of the shell body 110 downward against the vehicle seat 186. Owing the reaction force exerted by the vehicle seat 186 (in particular by the underlying rigid support frame 188), this results in a stress concentration in the region 110F (better shown in FIG. 2) of the shell body 110, which can be advantageously dissipated with crushing of the cushioning parts 180. As a result, less crash energy would be transferred to the rest of the child safety seat 100, in particular to the child sitting thereon.

Advantages of the child safety seat described herein include a support base that can be conveniently operated and prevent erroneous installation. Moreover, the support base can include a cushioning structure for dissipating stress concentration occurring during car collision, which can make the child safety seat safer in use.

Realizations of the support base and child safety seat have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A support base for a child safety seat, the support base comprising:
    a shell body configured to support a child seat, the shell body having a first and a second end opposite to each other, an upper surface facing upward, and an end surface extending generally vertical at the first end;
    a foot disposed at a bottom of the shell body adjacent to the first end, the foot being movable relative to the shell body to adjust an inclination of the support base; and
    a recline actuator connected with the shell body, the recline actuator engaging with the foot to lock the foot in position, the recline actuator having a first actuating portion exposed on the upper surface for operation and a second actuating portion exposed on the end surface for operation, each of the first actuating portion and the second actuating portion being respectively operable to cause an unlocking movement of the recline actuator for disengaging the recline actuator from the foot.

2. The support base according to claim 1, wherein the first actuating portion of the recline actuator is exposed on the upper surface proximate to the first end of the shell body.

3. The support base according to claim 1, wherein the recline actuator further includes a latching portion configured to engage with the foot for locking the foot with the shell body.

4. The support base according to claim 3, wherein the foot includes a plurality of locking grooves, and the latching portion selectively engages with one of the locking grooves for keeping the support base in an inclined position.

5. The support base according to claim 1, wherein the recline actuator, including the first and second actuating portions, is formed integrally as a single part.

6. The support base according to claim 1, wherein the recline actuator is pivotally connected with the shell body.

7. The support base according to claim 1, wherein the shell body further includes two seat mounts protruding upward and transversally spaced apart from each other, the first actuating portion being located between the two seat mounts.

8. The support base according to claim 1, further including a belt restraining frame pivotally connected with the shell body, the belt restraining frame being rotatable relative to the shell body between a release position where the belt restraining frame rises away from the upper surface of the shell body, and a clamping position where the belt restraining frame is adjacent to the upper surface for holding an anchoring belt.

9. The support base according to claim 8, wherein the belt restraining frame includes a transversal portion, two side portions, and a middle portion located between the two side portions, the two side portions and the middle portion being fixedly connected with the transversal portion and having respective ends connected pivotally with the shell body, the middle portion having an opening in which the first actuating portion of the recline actuator is at least partially received when the belt restraining frame is in the clamping position.

10. The support base according to claim 9, wherein the belt restraining frame is assembled with a latching member and a release actuator that are connected with each other, the latching member engaging with a corresponding structure provided on the shell body to lock the belt restraining frame in the clamping position, and the release actuator being operable to disengage the latching member from the corresponding structure on the shell body for unlocking the belt restraining frame.

11. The support base according to claim 10, wherein the release actuator is disposed adjacent to a junction between the middle portion and the transversal portion of the belt restraining frame.

12. The support base according to claim 1, wherein the shell body is further affixed with at least one cushioning part configured to deform or break under a crash load occurring during a car collision, the at least one cushioning part being closer to the second end than the first end of the shell body.

13. The support base according to claim 12, wherein the at least one cushioning part is made of plastics.

14. The support base according to claim 12, wherein the shell body further has a lateral side extending between the first and second ends, the at least one cushioning part being adjacent to the lateral side.

15. The support base according to claim 14, wherein the at least one cushioning part is exposed outward on the lateral side of the shell body.

16. The support base according to claim 12, wherein the shell body further has two opposite lateral sides extending between the first and second ends, the at least one cushioning part including two cushioning parts respectively adjacent to the two lateral sides of the shell body.

17. The support base according to claim 12, wherein the shell body further has a first and a second region respectively adjacent to the first and second end, the first region projecting upward higher than the second region, and the at least one cushioning part being provided in the second region of the shell body.

18. The support base according to claim 12, wherein the at least one cushioning part includes one or more inner cavity.

19. The support base according to claim 1, wherein the first end of the shell body is positioned against a seatback of the vehicle seat when the support base is installed on a vehicle seat.

20. The support base according to claim 1, wherein the foot is pivotally connected with the shell body.

21. A support base for a child safety seat, the support base comprising:
a shell body configured to support a child seat, the shell body having a first and a second end opposite to each other, an upper surface facing upward, and an end surface extending generally vertical at the first end;
a foot disposed at a bottom of the shell body adjacent to the first end, the foot being movable relative to the shell body to adjust an inclination of the support base;
a recline actuator connected with the shell body, the recline actuator engaging with the foot to lock the foot in position, the recline actuator having an actuating portion exposed on the upper surface for operation, the actuating portion being operable to cause an unlocking movement of the recline actuator for disengaging the recline actuator from the foot; and
a belt restraining frame pivotally connected with the shell body, the belt restraining frame being rotatable relative to the shell body between a release position where the belt restraining frame rises away from the upper surface of the shell body, and a clamping position where the belt restraining frame is adjacent to the upper surface for holding an anchoring belt, wherein the belt restraining frame includes a transversal portion, two side portions, and a middle portion located between the two side portions, the two side portions and the middle portion being fixedly connected with the transversal portion and having respective ends connected pivotally with the shell body, the middle portion having an opening in which the actuating portion of the recline actuator is at least partially received when the belt restraining frame is in the clamping position.

22. The support base according to claim 21, wherein the belt restraining frame is assembled with a latching member and a release actuator that are connected with each other, the latching member engaging with a corresponding structure provided on the shell body to lock the belt restraining frame in the clamping position, and the release actuator being operable to disengage the latching member from the corresponding structure on the shell body for unlocking the belt restraining frame.

23. The support base according to claim 22, wherein the release actuator is disposed adjacent to a junction between the middle portion and the transversal portion of the belt restraining frame.

24. A support base for a child safety seat, the support base comprising:
a shell body configured to support a child seat, the shell body having a first and a second end opposite to each other, an upper surface facing upward, an end surface extending generally vertical at the first end, and a lateral side extending between the first and second ends;
at least one cushioning part affixed with the shell body and configured to deform or break under a crash load occurring during a car collision, wherein the at least one cushioning part is adjacent to and exposed outward on the lateral side and is closer to the second end than the first end of the shell body;
a foot disposed at a bottom of the shell body adjacent to the first end, the foot being movable relative to the shell body to adjust an inclination of the support base; and
a recline actuator connected with the shell body, the recline actuator engaging with the foot to lock the foot in position, the recline actuator having an actuating portion exposed on the upper surface for operation, the actuating portion being operable to cause an unlocking movement of the recline actuator for disengaging the recline actuator from the foot.

25. The support base according to claim 24, wherein the at least one cushioning part includes one or more inner cavity.

* * * * *